United States Patent [19]
Furukawa et al.

[11] 3,953,106
[45] Apr. 27, 1976

[54] IMAGE STABILIZING OPTICAL SYSTEM
[75] Inventors: Hiroshi Furukawa, Tokyo; Akira Tajima, Kawasaki, both of Japan
[73] Assignee: Canon Kabushiki Kaisha, Tokyo, Japan
[22] Filed: June 18, 1974
[21] Appl. No.: 480,467

Related U.S. Application Data
[63] Continuation-in-part of Ser. No. 405,631, Oct. 11, 1973, abandoned, which is a continuation of Ser. No. 209,619, Dec. 20, 1971, abandoned.

[30] Foreign Application Priority Data
Dec. 28, 1970  Japan............................ 45-128422

[52] U.S. Cl. ............................................... 350/16
[51] Int. Cl.² ........................................ G02B 23/00
[58] Field of Search ....................... 350/16; 354/70; 356/248, 250

[56] References Cited
UNITED STATES PATENTS

| | | | |
|---|---|---|---|
| 2,959,088 | 11/1960 | Rantsch | 350/16 X |
| 3,378,326 | 4/1968 | Alvarez | 350/16 |
| 3,531,176 | 9/1970 | Humphrey | 350/16 |
| 3,781,121 | 12/1973 | Gross | 356/247 |

*Primary Examiner*—David H. Rubin
*Attorney, Agent, or Firm*—Toren, McGeady and Stanger

[57] ABSTRACT

A stabilized optical system consisting of an afocal front inverted Galileian telescopic system section and a relay rear lens system section, said telescopic system being designed to incorporate a plano-convex or plano-concave lens element of forward convexity or forward concavity as the rearmost lens element movable relative to the other lens elements. The rearmost lens element being held in fixed spatial alignment with an original line of sight axis by means of a substantially free gyro coupled thereto, while the remaining lens elements are secured in fixed relation to the housing of an instrument containing the optical system in coaxial alignment with the relay lens for jiggling about the center of curvature of the rearmost lens element. Thus accidental displacement or motion of the housing relative to the original line of sight axis can be exactly compensated to provide for stationary optical images inasmuch as the equation $M = N - 1$ is satisfied. $M$ is the angular magnification power of the entire telescopic system including said image stabilizing rearmost lens element and $N$ is the index of refraction of the rearmost lens element.

4 Claims, 7 Drawing Figures

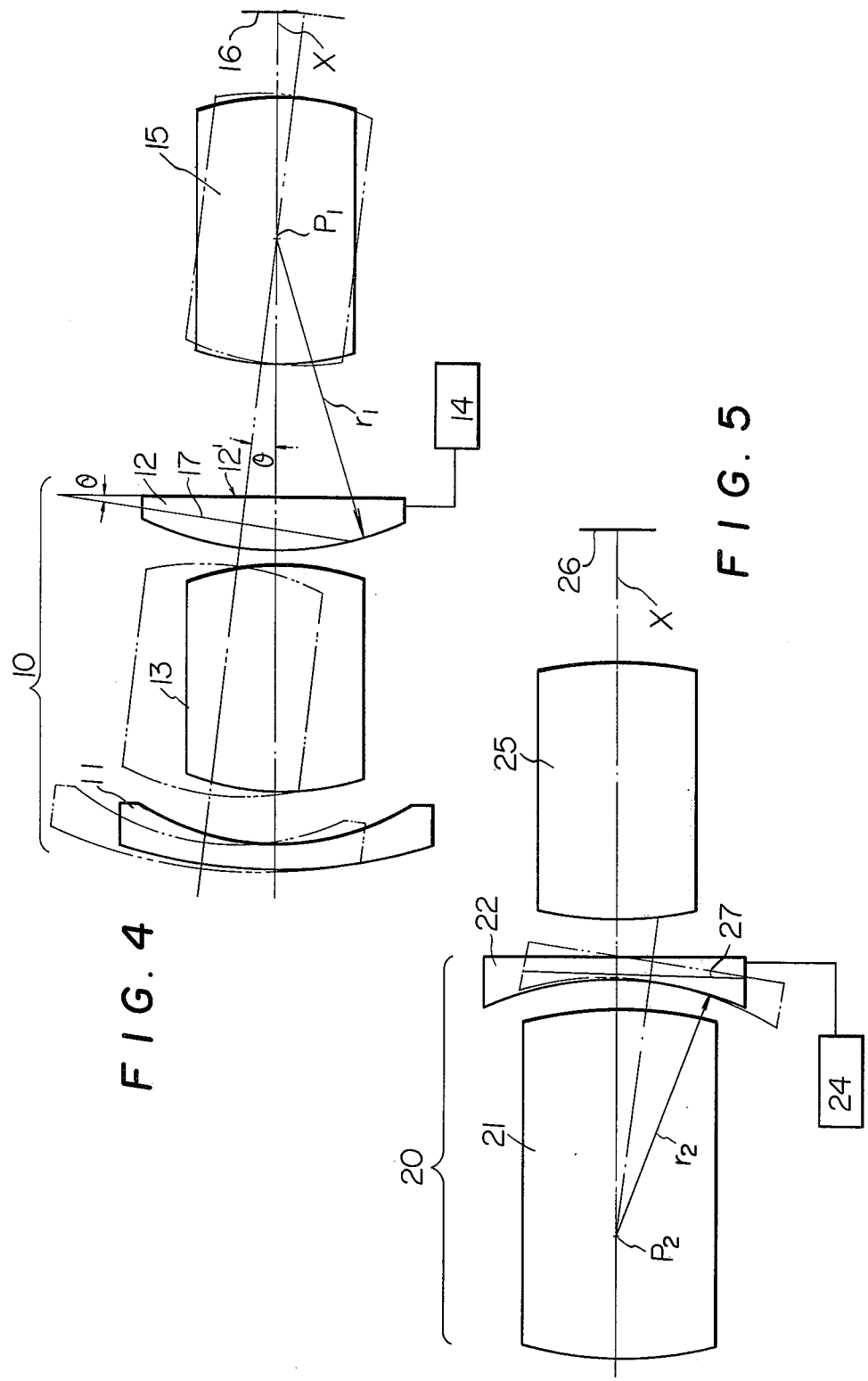

IMAGE STABILIZING OPTICAL SYSTEM

REFERENCE TO RELATED PATENT APPLICATIONS

This application is a continuation-in-part of our co-pending application, Ser. No. 405,631 filed Oct. 11, 1973, now abandoned, which was a continuation of U.S. application Ser. No. 209,619 filed Dec. 20, 1971, now abandoned.

BACKGROUND OF THE INVENTION

This invention relates to an image stablizing optical system for cinematographic cameras and other optical instruments which is arranged to compensate for jiggle or oscillation of the image at the focal plane despite accidental displacements of the instrument relative to a desired line of sight which may arise, for example, when photographing with the camera unstably held by hand.

In prior art stabilized optics of the nature described above, there is already known an accidental motion compensator employing optical wedges mounted in front of an objective lens system. Each of the optical wedges includes two optical elements arranged in mating rotatable relationship to each other so as to generate a prism having a variable wedge angle by which the incoming light rays are deflected in passing therethrough. The rays then enter the film gate in fixed relation irrespective of angular deviations of the objective lens system from the intended line of sight. Inasmuch as the number of optical wedges employed is restricted to only one, however, transparent materials having an index of refraction of two should be selected for employment in the optical wedge, or otherwise a series of optical wedges are necessary to be employed which are made from commercially available index materials. There has also been developed a certain stabilized optical system including reflecting means incorporated therein as a part of its image stabilizing mechanism. However, in order to compensate for accidental motion in two dimensions, the weight and bulk of the reflecting means unavoidably increases.

SUMMARY OF THE INVENTION

An object of the present invention is to provide an image stabilizing optical system in which all the lens components may be made from commercially available materials having low indices of refraction.

Another object of the present invention is to provide an image stabilizing optical system of simple structure effected by limitation of the number of optical members which are to be held in fixed spatial alignment with the intended line of sight by means of a stabilizer such as a gyro coupled thereto to only one of said members.

A further object of the present invention is to provide an image stabilizing system adapted to be incorporated in a hand-held optical instrument such as a cine camera by the minimization of size of the assembly with the image stabilizing system therein.

An additional object of the present invention is to provide an image stabilizing optical system which provides for accidental motion compensation in a range of high jiggle frequencies.

BRIEF EXPLANATION OF THE DRAWINGS

FIG. 4 is a schematic illustration in sectional view of an embodiment of the stabilized lens system in accordance with the invention in two operational positions.

FIG. 5 is a schematic illustration in sectional view of another embodiment of the stabilized lens system in accordance with the invention in two operational positions.

PREFERRED EMBODIMENTS OF THE INVENTION

Figure 1:
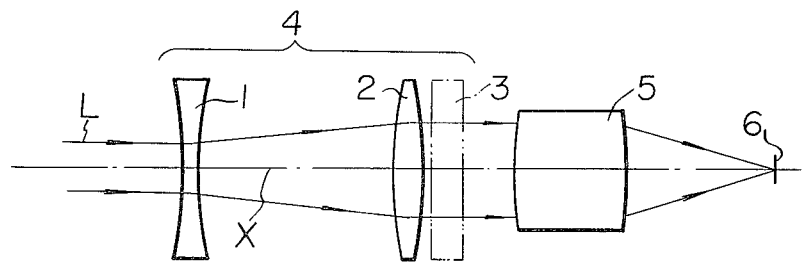
FIG. 1 is a schematic illustration in sectional view of a stabilized lens system in accordance with the present invention to illustrate the principle of the invention in the basic form.
Figure 2:
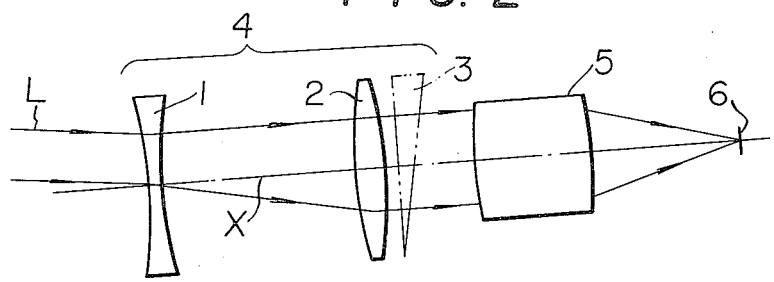
FIG. 2 is a schematic illustration in sectional view of the stabilized lens system of FIG. 1 with the optical axis deviated from an original line of sight.
Figure 3:
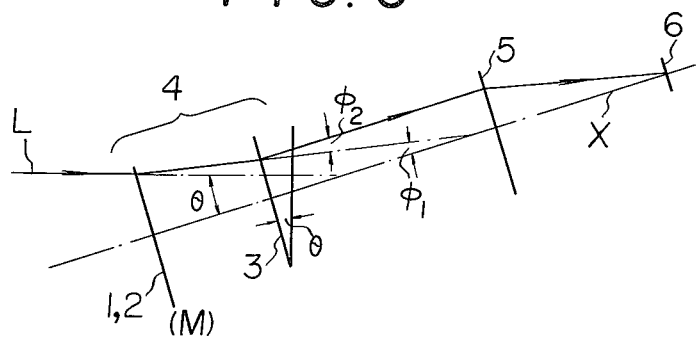
FIG. 3 diagrammatically illustrates the motion compensating action of the stabilized lens system in terms of geometrical optics.

The invention, in its broader aspects, is illustrated in FIG. 1, 2 and 3 wherein a stabilized optical system is illustrated as comprising an image stabilizing lens system section 4 including a concave lens 1 and a convex lens 2 arranged in coaxial alignment with a relay lens system section 5. The dash-line block that is indicated at 3, for purpose of only the illustration of the functional principle of the invention, is an imaginary deflecting means having an index of refraction, N, and, therefore, such a deflecting means is not provided as an independent means in the embodiments to be subsequently described. The lenses 1 and 2 and the deflecting means constituting an afocal front inverted Galileian telescopic system section 4 is arranged relative to the relay lens system section 5 so as to focus on a focal plane 6 the rays of light coming from an object. For the purpose of facilitating the understanding of the accidental motion compensating action, the stabilized optical system described above will be limited to operation in a vertical plane.

When the stabilized optical system which is initially maintained in alignment with an object being photographed is tilted to an angle $\theta$ with respect to the initial line of sight axis as depicted in FIG. 2, the rays of light deflected by the deflecting means enter the relay lens parallel to its axis. Accordingly the relay lens focuses the rays at the same point on the focal plane as that for which the rays were focused when the optical system was aligned with initial line of sight axis. If the deflecting means 3 is not present, the exit rays from the telescopic system would be incident upon the relay lens at an angle other than zero with respect to the optical axis, thereby being focused at a different point. Therefore, accommodation for the function equivalent to that of the deflecting means is made so that the rays emerging from the convex lens 2 are directed to the relay lens parallel to its axis to compensate the displacements of the system from an original line of sight axis.

The foregoing will be better understood in terms of geometrical optics upon reference to FIG. 3, wherein the stabilized optical system is illustrated diagrammatically as being tilted at an angle $\theta$ to the original line of sight axis X. In this case, the angle of incident light, $\psi_1$, upon the deflecting means with respect to the optical axis is given by $\psi_1 = M\theta$.

On the other hand, since the deflecting means that functions as a variable prism has a wedge angle $\theta$, the angle of deflection, $\psi_2$, is given by $\psi_2 = (N-1)\theta$, provided that the prism may be considered to be a thin prism. If $\psi_1 = \psi_2$, then the rays of light deflected by the prism enter the relay lens parallel to its axis. Therefore, inasmuch as the equation $M = N - 1$ is satisfied, the images are brought to focus at the same relative positions of the film regardless of the angular deviations of the optical system from the original line of sight axis X.

According to the present invention, the rearmost lens element of the afocal inverted Galileian telescopic system is made to function as the deflecting means, and this rearmost lens element functions as an optical wedge against the angular deviations of the instrument as a whole from the original line of sight in horizontal and vertical direction as well as an intermediate direction between the horizontal and vertical direction.

In an embodiment of the present invention shown in FIG. 4, the numeral character 10 designates an afocal inverted Galileian telescopic system comprising a first front lens element 11, a rearmost lens element 12, and a plurality of lens elements 13 disposed between the lenses 11 and 12, and having an angular magnification power, M. The lens elements other than the rearmost lens element 12 are secured as a unit in fixed relation to the housing not shown.

The rearmost lens element is a plano-convex lens of forward convexity with the radius of curvature $r_1$, and is supported by means of gimbals not shown so as to place the center of the curvature of the convex surface of the rearmost lens element 12 at a certain predetermined point $P_1$ on the optical axis. The lens element 12 is held in fixed spatial alignment with the original line of sight by means of a gyro stabilizer 14 coupled thereto. The relay lens 15 is secured to the housing in coaxial alignment with the telescopic system, focusing the incoming rays parallel to its axis on the image plane 16. The afocal inverted Galileian telescopic system 10 is designed so as to satisfy the equation $M = (N-1)$ defined in connection with FIG. 3, and N refers herein to the index of refraction of the rearmost lens material.

Suppose that the stabilized optical system of the construction described above is accidentally tilted about the point $P_1$ at an angle $\theta$ with respect to the original line of sight as is shown in the operational position indicated by the dash lines. The lens element 12 is stabilized to resist movement from a previous spatial orientation, so that the incoming light rays from the lenses 11 and 13 are deflected in passing through the lens element 12 by virtue of a prism having the index of refraction equal to N generated in the lens element 12 which is defined by the plane indicated at 17 and the rear plane lens surface indicated at 12'. Thus, with the telescopic system, the rays of light emerging from the lens element 12 of the inverted telescopic system is in a deflection angle equal to the angle of deviation, $\theta$, of the entire optical system with respect to the original line of sight, so that the relay lens 15 focuses the rays at the same point on the focal plane 16 to provide stationary images despite accidental displacements of the optical system relative to the line of sight.

Another embodiment of the invention is illustrated in FIG. 5 wherein the stabilized lens system is illustrated as comprising an afocal front inverted Galileian telescopic system section 20 and a relay rear lens system section 25. The telescopic system 20 includes a plano-concave lens element 22, of forward concavity as the rearmost lens element which is held in fixed spatial alignment with an original line of sight by means of a gyro coupled thereto. Reference characters $R_2$ and $P_2$ designate respectively the radius and center of curvature of the lens element 22 which is rotatable about a point $P_2$ relative to the other lens elements indicated at 21. The prism generated in the lens element 22 upon rotation thereof is defined by the plane indicated at 27 and the rear plane lens surface indicated by the dashed line. The accidental displacement compensation is effected by the combination of the deflecting action of the prism and the action of the inverted telescopic system itself.

Figure 6:
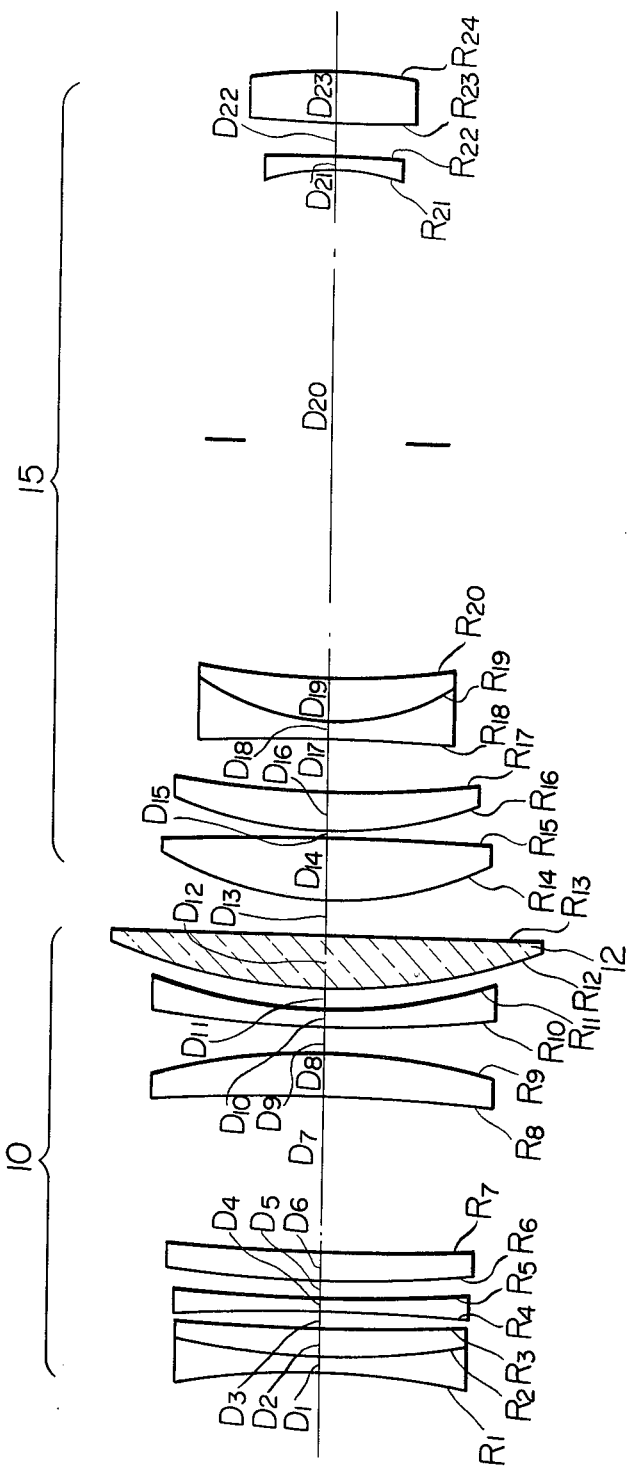
FIG. 6 is one example of a practical embodiment of the stabilized lens system shown in FIG. 4.
Figure 7:
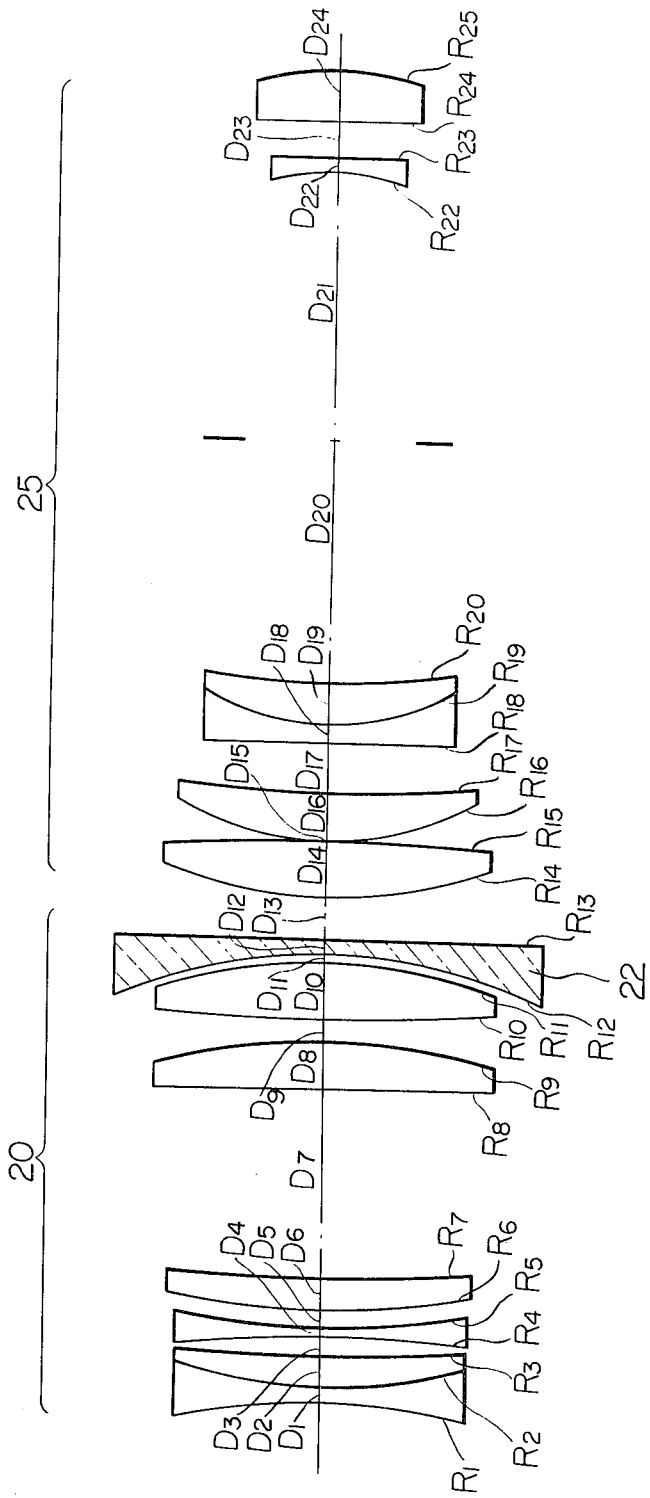
FIG. 7 shows one embodiment of a lens system used in the embodiment shown in FIG. 5.

An example of the image stabilized lens system as shown in FIG. 6 may be constructed in accordance with the numerical data given in the following table wherein the stabilized rearmost lens 12 of the inverted telescopic system 10 has an index of refraction of 1.6935, while the telescopic system has an angular magnification of 0.6935. The symbols in the table have the following meaning:

FIG. 7 shows one embodiment of a lens system used in the embodiment shown in FIG. 5. In FIG. 7, 20 is an afocal inverted telescopic system, 25 is a relay lens system and 22 is a stabilized rearmost lens.

R : Radii of curvature of the successive refracting surfaces.

D : Axial thicknesses of the successive lens elements, or airspaces.

N : Refractive indices for $d$ line of spectrum of glasses of the successive lens elements.

V : Abbe numbers of glasses of the successive lens elements.

Table 1

|   | R | D | N | f = 1 V |
|---|---|---|---|---|
| 1 | −0.5729 | 0.0121 | 1.6935 | 53.3 |
| 2 | 0.5165 | 0.0243 | 1.72151 | 29.2 |
| 3 | 1.9879 | 0.0126 | | |
| 4 | −1.5181 | 0.0121 | 1.6935 | 53.3 |
| 5 | 1.8216 | 0.0134 | | |
| 6 | 1.0557 | 0.0267 | 1.80518 | 25.4 |
| 7 | 3.6837 | 0.1245 | | |
| 8 | −2.1033 | 0.0389 | 1.48749 | 70.1 |
| 9 | −0.4572 | 0.0202 | | |
| 10 | 1.2422 | 0.0146 | 1.72151 | 29.2 |
| 11 | 0.4126 | 0.0144 | | |
| 12 | 0.4373 | 0.0462 | 1.6935 | 53.3 |
| 13 | ∞ | 0.0292 | | |
| 14 | 0.3011 | 0.0512 | 1.48749 | 70.1 |
| 15 | −5.2238 | 0.0025 | | |
| 16 | 0.2964 | 0.0379 | 1.48749 | 70.1 |
| 17 | 1.0400 | 0.0406 | | |
| 18 | −5.5206 | 0.0162 | 1.7859 | 44.2 |
| 19 | 0.1950 | 0.0358 | 1.47069 | 67.4 |
| 20 | 0.5590 | 0.4193 | | |
| 21 | −0.1668 | 0.0115 | 1.713 | 54.0 |
| 22 | −1.1098 | 0.0271 | | |
| 23 | 3.8970 | 0.0427 | 1.5927 | 35.6 |
| 24 | −0.2639 | | | |

Table 2

|   | R | D | N | f = 1 V |
|---|---|---|---|---|
| 1 | −0.5561 | 0.0119 | | |
| 2 | 0.4382 | 0.0239 | 1.6935 | 53.3 |
| 3 | 1.6464 | 0.0124 | 1.72151 | 29.2 |
| 4 | −1.9974 | 0.0119 | | |
| 5 | 1.0015 | 0.0131 | 1.6935 | 53.3 |
| 6 | 0.7826 | 0.0263 | | |
| 7 | 3.6136 | 0.1502 | 1.80518 | 25.4 |
| 8 | −8.1770 | 0.0382 | | |
| 9 | −0.4857 | 0.0177 | 1.48749 | 70.1 |
| 10 | 1.7918 | 0.0454 | | |
| 11 | −0.4539 | 0.0044 | 1.6935 | 53.3 |

Table 2-continued

|    | R       | D      | N       | f = 1 V |
|----|---------|--------|---------|---------|
| 12 | −0.4298 | 0.0143 |         |         |
| 13 | ∞       | 0.0287 | 1.68893 | 31.1    |
| 14 | 0.2959  | 0.0503 |         |         |
| 15 | −5.1346 | 0.0024 | 1.48749 | 70.1    |
| 16 | 0.2913  | 0.0373 |         |         |
| 17 | 1.0223  | 0.0399 | 1.48749 | 70.1    |
| 18 | −5.4263 | 0.0160 |         |         |
| 19 | 0.1917  | 0.0352 | 1.7859  | 44.2    |
| 20 | 0.5494  | 0.1910 | 1.47069 | 67.4    |
| 21 | ∞       | 0.2211 |         |         |
| 22 | −0.1640 | 0.0113 | 1.713   | 54.0    |
| 23 | −1.0908 | 0.0266 |         |         |
| 24 | 3.8305  | 0.420  | 1.5927  | 35.7    |
| 25 | −0.2594 |        |         |         |

What is claimed is:

1. In an image stabilizing lens system for an optical instrument having means for stabilizing said lens system and having an imaging lens system therein comprising an afocal inverted Galileian telescopic system section arranged in front of said imaging lens system, the rearmost lens element of said inverted Galileian telescopic system being defined by a spherical front surface and a substantially plane rear surface, and pivoted at substantially the center of curvature of said rearmost lens element for being maintained by said stabilization means in fixed angular orientation with respect to an original line of sight in order to compensate for jiggle of the image at the focal plane despite accidental angular displacement of said instrument with respect to the original line of sight and wherein a relationship between the index of refraction, $N$, of a transparent material employed in said rearmost lens element and the angular magnification power, $M$, of said entire afocal inverted Galileian telescopic system is established so that $M$ is substantially equal to $N - 1$.

2. An image stabilizing lens system according to claim 1, wherein said rearmost lens element is a plano-convex lens of forward convexity.

3. An image stabilizing lens system according to claim 1, wherein said rearmost lens element is a plano-concave lens of forward concavity.

4. An image stabilizing lens system according to claim 1, wherein said rearmost lens element has a diameter which is greater than that of any of lens elements disposed adjacent said rearmost lens element.

* * * * *